United States Patent [19]

Ceska

[11] Patent Number: 4,874,675

[45] Date of Patent: Oct. 17, 1989

[54] METHOD OF PROTECTING OR RECONDITIONING A SURFACE WITH A POLYMER CONCRETE

[75] Inventor: Gary W Ceska, Paoli, Pa.

[73] Assignee: Sartomer Company, Inc., West Chester, Pa.

[21] Appl. No.: 101,082

[22] Filed: Sep. 25, 1987

Related U.S. Application Data

[62] Division of Ser. No. 800,858, Nov. 22, 1985, Pat. No. 4,722,976.

[51] Int. Cl.$^4$ .................... B32B 13/12; B32B 27/04; C08J 5/24
[52] U.S. Cl. .................................. 428/521; 427/136; 427/140; 428/63; 428/523; 428/703; 428/500
[58] Field of Search ................ 427/136, 140; 428/63, 428/203, 521, 523, 500

[56] References Cited

U.S. PATENT DOCUMENTS

| | | | |
|---|---|---|---|
| 3,832,423 | 8/1974 | Milkovich et al. | 525/910 |
| 3,862,098 | 1/1975 | Milkovich et al. | 525/910 |
| 3,862,102 | 1/1975 | Milkovich et al. | 525/910 |
| 3,862,267 | 1/1975 | Milkovich et al. | 525/314 |
| 4,231,917 | 11/1980 | Zeldin et al. | 524/863 |
| 4,242,415 | 12/1980 | Feltzin et al. | 525/910 |
| 4,299,761 | 11/1981 | Emmons et al. | 428/63 |
| 4,347,174 | 8/1982 | Nagase et al. | 523/116 |
| 4,400,413 | 8/1983 | Emmons et al. | 524/554 |
| 4,422,996 | 12/1983 | Navin et al. | 525/920 |
| 4,500,674 | 2/1985 | Fontana et al. | 524/650 |
| 4,522,969 | 6/1985 | O'Connor et al. | 525/920 |

FOREIGN PATENT DOCUMENTS 637875 9/1961 Canada ............................. 427/146

*Primary Examiner*—Allan M. Lieberman
*Attorney, Agent, or Firm*—Patrick C. Baker; A. J. Good; R. Laddie Taylor

[57] ABSTRACT

Composition for preparing a polymer concrete, a method of protecting or reconditioning surfaces by treatment with the composition, the protected or reconditioned surfaces thus-treated, and multi-package systems for bringing the components of the composition to an application site, wherein the composition comprises a substantially non-aqueous slurry of (1) an aggregate material and (2) a monomer binder system effective to bind the aggregate, upon curing, into a polymer concrete, the binder system comprising (a) a liquid comonomer component, (b) a solid, thermoplastic macromonomer component dissolved in the comonomer and comprising a linear polymer terminated at one or both ends with a polymerizable end group, and (c) a polymerization catalyst.

12 Claims, No Drawings

METHOD OF PROTECTING OR RECONDITIONING A SURFACE WITH A POLYMER CONCRETE

This application is a division of application Ser. No. 800,858, filed Nov. 22, 1985 now U.S. Pat. No. 4,722,976.

BACKGROUND OF THE INVENTION

This invention relates to compositions for preparing polymer concrete useful for the protection or reconditioning of surfaces and for other applications.

A polymer concrete (sometimes abbreviated herein as "PC") is a composite material formed by polymerizing a monomer in admixture with an aggregate, wherein the polymerized monomer operates as a binder for the aggregate. These materials are to be distinguished from a polymerimpregnated concrete and from polymer-portland cement concrete. The former is a precast portland cement concrete subsequently impregnated with a monomer which is polymerized in situ, and the latter is a premixed material wherein either a monomer or polymer is added to a fresh concrete mixture in a liquid, powdery or dispersed phase, and subsequently polymerized (if needed) and cured. PC materials, as contrasted with polymer-portland cement concrete, are prepared from substantially non-aqueous compositions.

PC compositions, as well as the related polymer-impregnated concrete and polymer-portland cement concrete compositions, are reviewed in *Chemical, Polymer and Fiber Additives for Low Maintenance Highways*, edited by G. C. Hoff et al, Chemical Technology Review No. 130, Noyes Data Corporation, Park Ridge, New Jersey, 1979, particularly Chapter 10, "Polymers In Concrete," pages 430–479. Another review is *Chemical Materials for Constructions*, Phillip Maslow, Structures Publishing Company, Farmington, Michigan, 1979, particularly Chapter 4, "Epoxies With Concrete", pages 280–340. Representative patents concerning polymer concrete materials are U.S. Pat. Nos. 4,500,674 —Fontana et al and 4,460,625 —Emmons et al.

Typically, a composition for preparing a polymer concrete is a substantially non-aqueous slurry of an aggregate, a monomer binder system and a polymerization catalyst. These components are often packaged separately and mixed on-site, to avoid premature polymerization. Among the monomers used as binders are low viscosity monomers such as methyl methacrylate and styrene used singly or in admixture, and sometimes with other monofunctional monomers or with polyfunctional monomers such as trimethylol propane trimethacrylate. Polyester-styrene, furan, vinyl ester and epoxy resins and oligomers have also been used in preparing polymer concretes, in each case in combination with suitable catalysts for initiating and/or accelerating the curing of the compositions.

Generally, polymer concrete compositions exhibit substantially greater compressive strength, flexural strength and durability (chemical resistance), and essentially zero permeability to liquids, as compared with portland cement concrete. Despite such advantages, the known polymer concrete compositions tend to shrink unduly during hardening, cure either too slowly or with difficulty (often because of inhibition from ambient oxygen), and present environmental hazards because of volatile organic components.

SUMMARY OF THE INVENTION

It has now been found that the foregoing and other deficiencies of polymer concrete compositions may be eliminated or substantially reduced by employing as the monomer binder component of the composition, a thermoplastic macromonomer comprising a solid, linear polymer terminated at one or both ends with a functional group which is addition or condensation copolymerizable with a liquid comonomer component. The macromonomer, because it is already in a highly polymerized state, is inherently flexible and will exhibit little or no shrinkage upon copolymerization with the comonomer component. Moreover, the macromonomer apparently creates an oxygen barrier at the surface of the curable PC composition, thereby inhibiting the entry of ambient oxygen, a known polymerization inhibitor. Cure rate is therefore faster and/or more controllable at ambient temperature. Still further, because the macromonomer component is a solid, it has no tendency to flash and will reduce the flash point of the total monomer mixture of the PC composition.

The macromonomer also permits more effective control of viscosity of the PC composition, and the hardness and other properties of the cured material, by selection of molecular weight and type of macromonomer and comonomer components. In particular, because of the inherent flexibility and low shrinkage properties of the macromonomer component, the PC composition can include multifunctional monomers without detriment to the physical properties of the cured PC, including adhesion (shear bond). This benefit is not achievable with other, methacrylate-based, PC compositions. The PC compositions can also be formulated for low volatility and for substantially odorless, non-toxic application.

Accordingly, one aspect of the invention is a composition for preparing a polymer concrete, comprising a substantially non-aqueous slurry of (1) an aggregate material and (2) an amount of a monomer binder system effective, upon curing, to bind the aggregate into a polymer concrete, wherein the binder system comprises (a) a liquid comonomer component, (b) a solid, linear, thermoplastic macromonomer component, the macromonomer component being dissolved in the liquid monomer component and copolymerizable therewith through an addition or condensation mechanism, and (c) a polymerization catalyst.

In another aspect of the invention, a method of protecting or reconditioning a surface is provided wherein the surface is treated, e.g., coated or impregnated, with the aforesaid slurry, and the slurry is then permitted to cure under ambient conditions.

Other aspects of the invention include the surface obtained by practice of the protective or reconditioning method of the invention, and, as an article of manufacture, a multi-package system for admixture at the site of a surface to be reconditioned, wherein the packages comprise the aggregate material and the monomer binder system described above, respectively. The packaged components include a polymerization catalyst blended with the aggregate, or divided between the aggregate and the binder system. The catalyst may also be packaged separately in a manner described hereinafter.

DETAILED DESCRIPTION

The macromonomer component (b) of the PC compositions of the invention is a known thermoplastic material which is normally solid, i.e., solid under normal, ambient PC use conditions. Suitable macromonomers are described in numerous patents and other technical literature, including U.S. Pat. Nos. 3,786,116 and 3,862,267 to Milkovich et al, and other patents of Milkovich et al referenced in the article "Synthesis of Controlled Polymer Structures" by Ralph Milkovich, *Anionic Polymerization*, Chapter 3, pages 41–57, American Chemical Society (1981); U.S. Pat. Nos. 3,225,089--Short, 3,308,170--Pritchett et al, 4,169,115--Tung et al, and European Patent Application 104096 of Husman et al, published Mar. 28, 1984 (priority U.S. Ser. No. 419085 filed Oct. 16, 1982); and the article "Carbanions, Living Polymers, and Electron Transfer Processes", M. Szwarc, in *Synthetic Polymer Chemistry*, Chapter II, pages 95–103, Interscience Publishers (1968). All of the foregoing patents and technical literature, including the patents and technical articles referenced therein, are incorporated herein by reference. The various patents to Milkovich et al referenced above are for convenience referred to herein collectively as the "Milkovich patents."

As indicated above, the macromonomer component is a linear polymer which is terminated at one or both ends with an addition or condensation copolymerizable group and is therefore characterized as monofunctional or difunctional. If the macromonomer is monofunctional, it generally copolymerizes with a comonomer to form a graft copolymer; if difunctional, the copolymerization product generally will be a block copolymer.

Representative of monofunctional macromonomers which are addition copolymerizable are those of the formula R+Z+X wherein R is a hydrocarbon group containing up to about 20 carbon atoms, Z is a residue of a vinyl aromatic monomer, n is a positive integer such that the number average molecular weight of Z is about 2,000–100,000 or more, and X is a polymerizable, monoethylenically unsaturated end group. The molecular weight distribution (also known as "polydispersity", $M_w/M_n$) may range up to about 3 or more, the preferable upper limit being about 2. Preferably, the molecular weight of the macromonomers attributable to the vinyl aromatic portion may range from about 3,000 to about 50,000, more preferably about 3,000 to 30,000. In the macromonomer formula $RZ_{\overline{n}}X$, the polymerizable end group (X) itself may be oligomeric or polymeric, or may be a straight or branched-chain group, aliphatic or aromatic, and may contain one or more oxygen atoms. Generally, X may contain up to about 250 carbon atoms.

Preferred structures of X are the following:

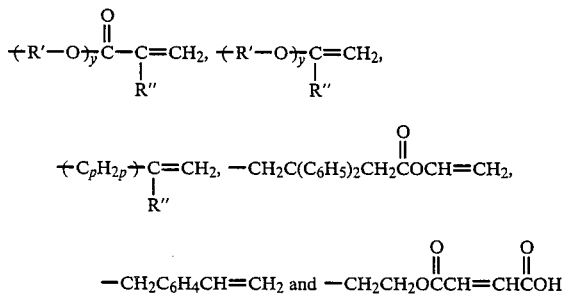

wherein R' is phenylethylene or $C_mH_{2m}$, m is 2, 3 or 4, p is a positive integer of from 2 to 8, y is a positive integer of from 1 to 50, and R" is hydrogen or lower alkyl ($C_1$–$C_8$). Most preferably, X is the residue of the reaction of an ethylene oxide group with acryloyl chloride or methacryloyl chloride and is thus defined by the structure

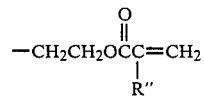

where R" is hydrogen or methyl.

From the standpoint of economical synthesis, the most preferred macromonomer is $RZ_{\overline{n}}X$ wherein R is lower alkyl (preferably 4 to 8 carbon atoms), Z is styrene or alpha methylstyrene and X is

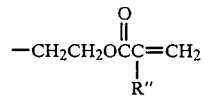

where R" is hydrogen or methyl.

Typical of the macromonomers which are condensation copolymerizable are those having one or two terminal hydroxyl or thiol groups, rendering them useful for condensation copolymerization with comonomers containing groups having active hydrogen atoms as defined by the Zerewitinoff method described in Kohler et al, J. Am. Chem. Soc., 40, 2181–8 (1927), such as carboxyl, amino or isocyanate groups, or combinations of such functionality. The hydroxyl- or thiol-terminated macromonomers are prepared in a manner analogous to vinylidene-terminated macromonomers, by anionic polymerization of one or more conjugated dienes, one or more vinyl aromatic hydrocarbons such as styrene, or alpha-methylstyrene, or mixtures thereof, using an alkali metal initiator such as lithium metal, butyl lithium or a di-lithium compound, to form living polymers or copolymers terminated at one or both ends with the alkali metal, followed by capping with an alkylene oxide, alkylene epi sulfide or sulfur to form an epoxide, episulfide or mercapto terminated copolymeric macromonomer wherein the epoxide or episulfide groups are easily hydrolyzable to hydroxyl or thiol groups, respectively. If a mixture of diene and vinyl aromatic hydrocarbon is used in the anionic polymerization, the macromonomer product is a random copolymer. If only one of the diene and vinyl aromatic monomers is polymerized, followed by copolymerization with the remaining monomer, the product is a block copolymer.

Typical conjugated dienes useful in preparing the foregoing condensation macromonomers are those containing 4 to 8 or more carbon atoms such as 1, 3-butadiene, 2-methyl 1,3-butadiene (isoprene), 2, 3-dimethyl-1,3-butadiene, 1,3-pentadiene, 1,3-hexadiene, and the like. The vinyl aromatic hydrocarbons include styrene, alpha-methylstyrene, and nuclear-substituted styrenes such as vinyl toluene, indene, and p-tert butylstyrene.

Patents which describe such condensation macromonomers are the Milkovich patents, particularly U.S. Pat. Nos. 3,786,116 and 3,842,050; U.S. Pat. Nos. 3,225,089, 3,308,170 and 4,169,115; and European Patent Application Publication 104046, cited above. Other suitable condensation macromonomers are described in *Macromolecular Reviews*, 2, 74–83 (1967), incorporated herein by reference along with the above-cited patents.

Suitable comonomer components (a) are any liquid compounds, including oligomers, resins and other macromonomers, which copolymerize with and initially also solubilize the normally solid macromonomer component (b) in the presence of a catalyst. Because of their dual utility as solubilizers and comonomers, the comonomer components (a) are often characterized as "reactive diluents".

When the polymerizable groups of the macromolecular component (b) are addition copolymerizable, the comonomer component (a) comprises one or more substantially non-volatile materials of up to about 2,000 molecular weight selected from monoethylenically unsaturated materials, polyethylenically unsaturated materials and mixtures thereof. Amounts of polyethylenically unsaturated materials greater than about 5 percent by weight of the total mixture of comonomer (a), macromonomer (b) and catalyst (c) may introduce a degree of crosslinking in the cured polymer concrete which, although increasing hardness and chemical resistance, may render the product too rigid and brittle for some applications. For many PC applications, however, thermoplastic rather than thermoset properties are desirable, and in such cases, therefore, a monofunctional comonomer will be the only comonomer or at least will be a major proportion of the comonomer component (a).

Representative of monofunctional comonomers include vinyl monomers such as acrylic acid, methacrylic acid, itaconic acid, and the like; the lower alkyl esters of acrylic or methacrylic acid, including methyl methacrylate, ethyl acrylate, 2-ethylhexyl acrylate, butyl acrylate and isobutyl methacrylate; the corresponding hydroxyl acrylates and methacrylates such as hydroxyethyl acrylate and hydroxypropylacrylate; vinyl esters such as vinyl acetate and vinyl propionate; vinyl halides such as vinyl chloride and vinylidene chloride; and particularly the high solvency monomers such as 2,2-ethoxyethoxyethyl acrylate, tetrahydrofurfuryl methacrylate and acrylate, n-laurylacrylate, 2-phenoxyethylacrylate and methacrylate, glycidyl acrylate, glycidyl methacrylate, isodecyl acrylate, isooctyl acrylate and methacrylate, and the like. Other monoethylenically unsaturated reactive diluents include vinyl aromatics such as styrene, alpha-methylstyrene, vinyl toluene, indene and p-tert butylstyrene; ethylenically unsaturated acids such as fumaric acid, maleic anhydride and the esters thereof; and nitrogen containing monomers such as acrylonitrile, methacrylonitrile, acrylamide, methacrylamide, N,N-dimethacrylamide, N-vinylpyrrolidine, N-vinylcaprolactam, and the like.

As a general rule, the foregoing mono-unsaturated comonomers will have lower second order (glass) transition temperatures, $T_g$, as homopolymer, than the macromonomer, but in some cases will not be as reactive as the polyunsaturated comonomers. Generally, also, the monoacrylates are good viscosity reducers whereas the polyacrylates, being more reactive, will be used to improve curing rate as well as to crosslink. The corresponding methacrylates are preferred when skin contact with the PC compositions is a risk, since methacrylates are less skin irritating than acrylates.

The polyethylenically unsaturated reactive diluents include polyol polyacrylates and polymethacrylates, such as alkane ($C_2$–$C_{16}$) diol diacrylates, aliphatic ($C_2$–$C_{16}$) polyacrylates, alkoxylated aliphatic polyacrylates such as described in U.S. Pat. No. 4,382,135, polyether glycol diacrylates and the like. Typical of the foregoing are 1,6hexanediol diacrylate, neopentyl glycol diacrylate, 1,3butylene glycol diacrylate, tripropylene glycol diacrylate, polyethylene glycol 200 diacrylate and tetra-ethylene glycol diacrylate. Other polyunsaturated reactive diluents are allyl compounds such as allylmethacrylate and diallylmethacrylate; acrylated epoxies, aminoplast acrylates and unsaturated polyesters; trimethylol propane based polyacrylates such as trimethylolpropane triacrylate; the pentaerythritol-based polyacrylates or polymethacrylates described in U.S. Pat. No. 4,399,192; acrylic and methacrylic oligomers; acrylated polymer or oil such as acrylated oligomers; acrylated polymer or oil such as acrylated epoxidized drying9-type oils, acrylated bisphenol A/epoxy resins, ethoxylated bisphenol A diacrylate, acrylated urethane prepolymers (also known as "acrylated polyurethanes"), polyethers, silicones, and the like.

The comonomers of component (a), particularly those which are polyfunctional, are conventionally sold with a free radical polymerization inhibitor content ranging from about 25 to 2000 ppm on comonomer weight.

The foregoing and other mono- and polyfunctional comonomers (a) (and inhibitors if used) are widely known and are described in the patent and other literature, such as component (1) of U.S. Pat. No.3,368,900, component (2) of U.S. Pat. Nos. 3,380,831 and 3,594,410, the polymerizable vehicles disclosed in U.S. Pat. Nos. 4,163,809 and 4,481,258, and the acrylated polymer or oils, acrylic oligomers and other radiation curable component (b) compounds disclosed in U.S. Pat. No. 4,360,540. All of the aforementioned patents are incorporated herein by reference.

In addition to reactivity and degree of crosslinkability, if desired, the comonomers of component (a) will be selected on the basis of their solvency for the macromonomer component (b) and contribution to the viscosity of the resulting solutions. PC compositions ranging from sprayable to extrudable character can thus be prepared. Generally, the less polar the comonomer, the greater the solvency for the macromonomer. In those cases where solvency of a macromonomer in a single comonomer is insufficient, one or more other comonomers may be added to optimize compatibility. The higher the molecular weight of the macromonomer the less soluble the macromonomer will be in some of the comonomers. Accordingly, molecular weight of macromonomer must be balanced with the ease with which slurries can be formed with the aggregate and acceptability of the resulting viscosities and properties relative to the end uses of the PC compositions. If the intended end use is as a continuous resurfacing composition, for example, lower macromonomer molecular weight, e.g., not over about 50,000, may be required in order to obtain good solvency and low viscosity in a given comonomer component or mixture of diluents. The formulator of PC compositions is well aware of the foregoing and other considerations and can make appropriate selections of components of the compositions and proportions by routine experimentation and judgment in order to obtain a desired balance of properties.

In the case of condensation copolymerizable macromonomers, the comonomer component (a) will be a low molecular weight compound, an oligomeric material or a polymeric material having one or two active hydrogen-containing groups (as hereinabove defined) for condensation with the terminal carboxyl, epoxide, episulfide, hydroxyl, thiol or mercapto groups of the macromonomer. Comonomers capable of condensation copolymerization are well known and include polybasic acids and anhydrides, such as adipic acid, phthalic anhydride, maleic anhydride, succinic anhydride, and the like, to form polyesters; aldehydes, such as polyformaldehyde, acetaldehyde, and ureaformaldehyde, to form polyacetals; polyisocyanates and polyisocyanate prepolymers, to form polyurethanes; and siloxanes to form polysiloxanes. Furthermore, as is well known, living polymers terminated with halo maleic anhydride, halo maleate ester or epoxy groups may be converted to terminal carboxyl or hydroxyl groups by conventional base hydrolysis.

The foregoing and a variety of other comonomers and directions for modifying macromonomer components for condensation polymerization, are well known such as described in the Milkovich patents referenced above (for example, U.S. Pat. No. 3,786,116, columns 13-17) and the article by Szwarc also cited above. Considerations of solvency for macromonomers and viscosity similar to addition-copolymerizable systems, as described above, apply to condensation-copolymerizable systems, and the comonomers may likewise be easily selected by the skilled PC composition formulator on the basis of solvency and viscosity control, and desired degree of thermoplasicity of the copolymerized material in the PC composition.

Generally, for both addition and condensation binder systems of the invention, because of the high molecular weight of the macromonomer component as compared with the comonomer component, the amount of macromonomer component (b) may be less than the amount of comonomer. Of course, in cases where the comonomer component is itself a polymeric material, the macromonomer component may be in major amount of the copolymerizable binder system. Accordingly, depending upon the molecular weight of the comonomer, the proportion of macromonomer to comonomer may range from about 99:1 to 1:99 on a weight basis.

A catalyst system (c) appropriate for the polymerization mechanism of the particular copolymerizable binder system will be used. Normally, the catalyst system is a non-radiation responsive type since photo-initiated PC compositions have little practical value. For copolymerization of macromonomers and comonomers having terminal ethylenic unsaturation, free radical catalyst systems are more commonly employed. Preferably, the free radical catalyst comprises an oil-soluble organic azo or peroxy primary catalyst (initiator), often in combination with a co-catalyst, also known as an accelerator or promoter, each being selected for effectiveness under ambient temperatures. Typical proportions of primary catalyst to co-catalyst are about 9:1 to 5:5. If only a primary catalyst is used, it may be necessary to heat the PC composition to induce curing. Generally, useful accelerators are reducing agents such as tertiary amines, ascorbic acid including isomers, reducing sugars, or transition metal organic compounds such as cobaltous acetylacetonate and other "siccatives" (drier salts) described in U.S. Pat. NO. 4,460,625.

The organic peroxy primary catalysts include diacyl peroxides such as acetyl peroxide and benzoyl peroxide; ketone peroxides such as 2,4-pentanedione peroxide; peroxyldicarbonates such di (sec-butyl) peroxydicarbonate; peroxyesters such as alpha-cumylperoxy neodecanoate and t-butylperoxy benzoate; dialkyl peroxides such as dicumyl peroxide; and the like. The foregoing and other organic peroxides are sold by Pennwalt Corporation under the trademark and designation "Lucidol" and are conveniently selected on the basis of their stablility as measured by half-life at desired temperatures of use. Other suitable catalyst systems are those described in the patents and publications cited above, such as U.S. Pat. Nos. 3,786,116, columns 18 and 19.

Cationic polymerization catalysts may also be used for addition copolymerizable binder systems, but such catalysts are generally more practical for condensation copolymerizations. The Milkovich patents disclose suitable condensation polymerization catalysts. Such catalysts include Lewis acids of which boron trifluoride, stannic chloride and aluminum chloride are representative. Useful cocatalysts (promoters) include water, alkyl halides, alcohols or combinations thereof.

The aggregate material of the PC compositions may be any inert inorganic particulate substance such as sand, gravel, crushed stone of various types, pebbles, and finely divided materials such as portland cement, powdered chalk, clay, flyash and silica flour, including mixtures of any of the substances. Generally, the aggregate will be selected to give a void volume which will require minimal amounts of monomer binder system to fill the voids and to give good workability. It is known that for a well-graded aggregate, larger maximum particle sizes require less resin but that smaller maximum particle sizes produce higher strength in the polymer concrete. Accordingly, depending upon the type and viscosity of the monomer binder system, one skilled in the art can select appropriate aggregate gradation, maximum particle size and composition for balance of amount of monomer binder system and desired PC strength. A typical composition, based upon a crushed stone/sand aggregate, will contain aggregate and monomer binder systems in proportions ranging from about 9:1 to 1:5, but preferably about 5:1 to 1:1 since compositions containing higher proportions of monomer binder system may be unduly expensive.

The PC compositions of the invention may also contain various additives for special properties and effects. Thus, fillers and flow control agents of various types may be added to assist in application and to modify the properties of the cured PC composition. Coloring agents may also be added, such as pigments or dyes, either to the aggregate or other component of the PC composition, or to the PC composition after blending. Sometimes the addition of coloring material or other agent will require dispersion of the additive in an aqueous medium, alone or in admixture with an emulsifier or surfactant, prior to blending with the PC composition or a component thereof. The presence of these minor amounts of water is not intended to be excluded by the term "substantially non-aqueous" as a descriptor of the PC compositions.

The aggregate and monomer binder system may be admixed in any manner suitable for control of the copylymerization of the binder components and convenience of use of the PC composition. For example, the aggregate, the macromonomer/comonomer blend of the monomer binder system and polymerization catalyst may be brought to the application site in separate packages and then admixed either manually or by the use of known metering/blending devices in the requisite proportions and sequences to obtain a PC composition having a viscosity and pot-life appropriate for the intended application. For example, if the application is discrete patching of a surface, a short pot-life (several minutes or hours) may be acceptable. On the other hand, if the application is continuous or in large quantities, such as reconditioning of a surface by continuous coating, resurfacing or impregnating, a pot-life of 4 to 8 hours or more may be required. In all applications, of course, the ambient temperature is an important consideration from the standpoint of the cure rate desired for the application. The skilled formulator and applicator of PC compositions is well aware of these and other conditions and can readily select components of the PC compositions and proportions as well as mode of application suited to the specific use.

When the components of the PC composition are packaged separately, the polymerization catalyst may be preadmixed with the aggregate, or split between the aggregate and monomer binder system, e.g., primary catalyst in either the aggregate or monomer binder system, and co-catalyst in the other of the aggregate and monomer binder system. Primary catalyst and co-catalyst (if used) may also be blended in a separate package.

The PC compositions of the invention may be used in a wide variety of circumstances for the protection and/or reconditioning of surfaces, whether the mode of application be by coating, patching, impregnating or other technique. For example, the PC compositions are useful as overlays on standard concrete for bridge decks (to seal off and to prevent moisture and salt penetration, and resultant corrosion and disintegration), as fast-cure (several hours up to a day or more) patches for roads and walkways, and as industrial coatings to prevent acoustic or acid-corrosion of platforms, conduits, reactors, dam structures, industrial passages, and the like.

The following will specifically exemplify the invention but is not intended to limit the scope thereof.

MACROMONOMER PREPARATION

A glass and stainless steel reactor is charged with 1100 grams of cyclohexane, pre-dried over molecular sieves, and 400 grams of styrene purified over activated alumina. The reactor temperature is raised to 70° C. and s butyllithium solution (1.4M in cyclohexane) is slowly added until a persistant light reddish-orange color is obtrained. An additional 100 ml (0.140 moles) of s-butyllithium is immediately added. Styrene is then pumped into the reactor for 30 minutes until a total of 1820 grams has been added. The temperature is maintained at 70° C. for 30 minutes and then 12.3 grams of ethylene oxide (0.28 moles) is added causing the solution to become colorless. To the resulting solution is added 16.1 grams (0.154 moles) of methacryloyl chloride to give upon removal of cyclohexane a solid macromonomer having the structural formula:

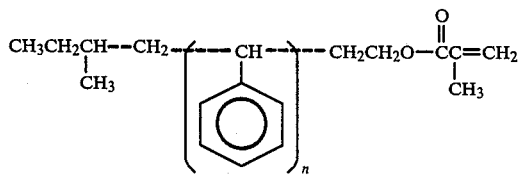

where n has a value such that the molecular weight is 13,000 as measured by GPC. The macromonomer product is purified by dissolving the solid material in toluene to form a 40 percent by weight solution. This solution is filtered through a half-inch bed of Celite 545 filter filtered through a half-inch bed of Celite 545 filter aid (Fisher) using water aspiration suction. The filtered toluene/macromonomer solution is reprecipitated into excess methanol and vacuum dried to provide a product which gives a non-cloudy (water white) solution when dissolved in toluene. The purified product is identified as macromonomer A in the following description.

POLYMER CONCRETE COMPOSITIONS

An aggregate is prepared by uniformly mixing crushed stone (½ to ¾ inch maximum size) and sand (rounded grain) in a ratio of 300 parts by weight of stone to 200 parts by weight of sand, and screening out all material passing a No. 50 sieve. A monomer binder system is prepared by dissolving macromonomer A in a comonomer component and adding cumene hydroperoxide (73% active) free radical initiator (primary catalyst). Cobaltous acetylacetonate co-catalyst (promoter) is uniformly admixed with the aggregate. PC compositions are then formulated by blending the monomer binder system into the aggregate-promoter mixture wherein the amounts of the components are:

|  | Parts by Weight |
|---|---|
| Aggregate | 500 |
| Monomer Binder Mixture | 100 |
| Catalyst system: | |
| primary (initiator) | 0.80 |
| co-catalyst (promoter) | 0.10 |

Table I below identifies the formulations and the composition of the monomer binder mixture in each formulation.

TABLE I

| Monomer Binder Mixes | Formulations | | | |
|---|---|---|---|---|
|  | 1A | 1B | 1C | 1D |
| (1) Macromonomer A | 0 | 10 | 20 | 30 |
| Isobornyl methacrylate | 95 | 85 | 75 | 65 |
| Trimethylolpropane trimethacrylate | 5 | 5 | 5 | 5 |
|  | 2A | 2B | 2C | 2D |
| (2) Macromonomer A | 0 | 10 | 20 | 30 |
| Tetrahydro furfuryl methacrylate | 95 | 25 | 75 | 65 |
| Trimethylolpropane trimethacrylate | 5 | 5 | 5 | 5 |
|  | 3A | 3B | 3C | 3D |
| (3) Macromonomer A | 0 | 10 | 20 | 30 |
| Methyl methacrylate | 100 | 90 | 80 | 70 |
|  | 4A | 4B | 4C | 4D |
| (4) Macromonomer A | 0 | 10 | 20 | 30 |
| Isobornyl methacrylate | 85 | 75 | 65 | 55 |
| Polypropylene glycol Monomethacrylate | 10 | 10 | 10 | 10 |
| Trimethylolpropane trimethacrylate | 5 | 5 | 5 | 5 |

Table II below summarizes predicted ratings on properties of the PC formulations measured by standard test procedures on the formulations in the pot prior to cure (flash point), during cure (surface cure time, i.e., time to tack-free surface) or after cure on a substrate at 25° C. ambient temperature (shrinkage, adhesion), where the rating is on a scale of 1 to 10 (worst to best), 1 indicating highest shrinkage, lowest adhesion, lowest flash point and slowest cure rate. The ratings indicate that the presence of increasing amounts of Macromonomer A will reduce shrinkage, increase adhesion, reduce flash point and enhance surface cure (reduce time to a tack-free surface).

TABLE II

| Rating of Properties of PC-Formulations | | | | |
|---|---|---|---|---|
| | 1A | 1B | 1C | 1D |
| Shrinkage | 5 | 6 | 8 | 10 |
| Adhesion | 3 | 4 | 5 | 7 |
| Flash Point | 6 | 7 | 8 | 9 |
| Surface Cure | 3 | 5 | 6 | 7 |
| | 2A | 2B | 2C | 2D |
| Shrinkage | 4 | 5 | 7 | 8 |
| Adhesion | 6 | 7 | 9 | 10 |
| Flash Point | 7 | 8 | 9 | 10 |
| Surface Cure | 3 | 6 | 7 | 8 |
| | 3A | 3B | 3C | 3D |
| Shrinkage | 4 | 5 | 2 | 8 |
| Adhesion | 1 | 1 | 2 | 2 |
| Flash Point | 1 | 1 | 1 | 1 |
| Surface Cure | 8 | 8 | 8 | 8 |
| | 4A | 4B | 4C | 4D |
| Shrinkage | 5 | 6 | 8 | 10 |
| Adhesion | 7 | 8 | 9 | 10 |
| Flash Point | 7 | 7 | 9 | 10 |
| Surface Cure | 3 | 5 | 7 | 7 |

I claim:

1. A method for protecting or reconditioning a surface, which comprises coating, patching, or impregnating the surface with a polymer concrete composition comprising a substantially non-aqueous slurry of (1) an aggregate material and (2) an amount of a monomer binder system effective to bind the aggregate, upon curing, into a polymer concrete, wherein the monomer binder system comprises:
  (a) a liquid comonomer component selected from (i) an addition copolymerizable component comprising at least one monoethylenically unsaturated monomer or a mixture of at least one monoethylenically unsaturated monomer and at least one polyethylenically unsaturated monomer, and (ii) a condensation copolymerizable compound having at least one active hydrogen-containing group;
  (b) a solid, thermoplastic macromonomer component dissolved in the liquid comonomer component and copolymerizable therewith to form a copolymer, the macromonomer component (b) comprising an anionically polymerized linear polymer terminated at one or both ends with a polymerizable and group, selected from (i) an addition polymer, copolymerizable exclusively with said addition copolymerizable liquid comonomer component (a)(i), of the formula:

$$RZ_{\overline{n}}X$$ 

wherein R is a hydrocarbon group containing up to about 20 carbon atoms, Z is the residue of a vinyl aromatic monomer, n is a positive integer such that the molecular weight of Z is about 2,000–50,000, and X is a polymerizable, monoethylenically unsaturated end group, and (ii) a polymer copolymerizable exclusively with said condensation copolymerizable liquid comonomer component (a)(ii), prepared by polymerizable of at least one conjugated diene, at least one vinyl aromatic hydrocarbon, or a mixture of at least one conjugated diene and at least one vinyl aromatic hydrocarbon, capping with carbon dioxide to provide carboxyl termination, or capping with an alkylene oxide, alkylene episulfide or sulfur followed by hydrolysis to provide hydroxyl or thiol termination; and
  (c) a polymerization catalyst for catalyzing the copolymerization; and permitting the polymer concrete composition to cure under ambient conditions.

2. The method of claim 1 wherein comonomer component (a) is methyl methacrylate and macromonomer component (b) has the structure:

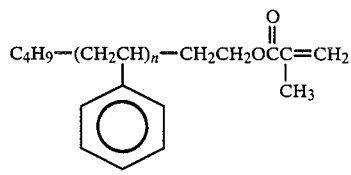

wherein n has a value such that the molecule weight of the macromonomer is about 2,000 to 30,000.

3. The method of claim 1 wherein macromonomer component (b) is a polymer prepared by anionic polymerization of at least one conjugated diene, at least one vinyl aromatic hydrocarbon, or a mixture of at least one conjugated diene and at least one vinyl aromatic hydrocarbon, capping with carbon dioxide to provide carboxyl termination, or capping with an alkylene oxide, alkylene episulfide or sulfur followed by hydrolysis to provide hydroxyl or thiol termination;
  and wherein comonomer component (a) is a compound having at least one active hydrogen-containing group, and said components (a) and (b) are condensation copolymerizable.

4. The method of claim 1 wherein both end groups of macromonomer component (b)(ii) are carboxyl or hydroxyl terminated.

5. The method of claim 1 wherein macromonomer component (b)(ii) has the structure:

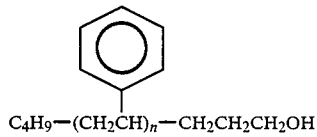

where n has a value such that the molecular weight of the macromonomer is about 2,000 to 30,000.

6. The method of claim 1 wherein x of the component (b) formula is selected from

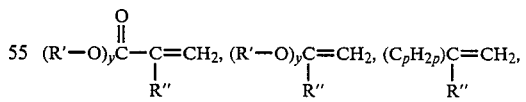

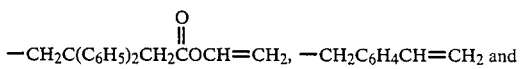

wherein R' is phenylethylene or $C_mH_{2m}$, m is 2, 3, or 4, p is a positive integer of from 2 to 8, y is a positive integer of from 1 to 50, and R" is hydrogen or lower alkyl.

7. The method of claim 1 wherein R of the component (b) formula is

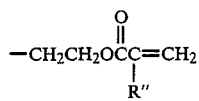

where R" is hydrogen or methyl.

8. The method of claim 1 wherein comonomer component (a) and macromonomer component (b) are addition copolymerizable.

9. The method of claim 1 wherein comonomer component (a) and macromonomer component (b) are condensation copoymerizable.

10. The method of claim 8 wherein comonomer component (a) is a mixture of at least one monoethylenically unsaturated compound and at least one polyethylenically unsaturated compound.

11. The method of claim 10 wherein the polyethylenically unsaturated compound is an alkane diol diacrylate or dimethacrylate, an aliphatic polyacrylate or polymethacrylate, an alkoxylated aliphatic polyacrylate or polymethacrylate, a polyether glycol diacrylate or dimethacrylate, or a mixture of two or more thereof.

12. The protected or reconditioned surface obtained by the method of claim 1.

UNITED STATES PATENT AND TRADEMARK OFFICE
CERTIFICATE OF CORRECTION

PATENT NO. : 4,874,675

DATED : October 17, 1989

INVENTOR(S) : Gary W. Ceska

It is certified that error appears in the above-identified patent and that said Letters Patent is hereby corrected as shown below:

Column 3, line 33, "R $\{Z\}$ X" should read --R $\{Z\}_n$X--.
Column 4, line 54, "2-methyl1, 3-butadiene (isoprene)" should read --2-methyl-1,3-butadiene (isoprene)--.
Column 6, line 12 "drying9-type" should read --drying-type--.
Column 11, line 48, "with a polymerizable and" should read -- with a polymerizable end--.
Column 11, line 54, "RZ$_{\overline{n}}$X" should read -- R$\{Z\}_n$X--.
Column 11, line 64, "polymerizable" should read --polymerization--.

Signed and Sealed this

Eighteenth Day of June, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,874,675

DATED : October 17, 1989

INVENTOR(S) : Gary W. Ceska

It is certified that error appears in the above-identified patent and that said Letters Patent is hereby corrected as shown below:

Column 14, line 3, "copoymerizable" should read --copolymerizable--.

Signed and Sealed this

Eighth Day of October, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,874,675

DATED : October 17, 1989

INVENTOR(S) : Gary W. Ceska

It is certified that error appears in the above-identified patent and that said Letters Patent is hereby corrected as shown below:

Column 14, line 3, "copoymerizable" should read --copolymerizable--.

Signed and Sealed this

Seventeenth Day of November, 1992

Attest:

DOUGLAS B. COMER

*Attesting Officer*   *Acting Commissioner of Patents and Trademarks*